R. M. MERRIMAN.
COLLAPSIBLE CORE.
APPLICATION FILED DEC. 30, 1916.

1,221,349.

Patented Apr. 3, 1917.
2 SHEETS—SHEET 1.

Inventor
R. M. Merriman.

By
Attorneys

R. M. MERRIMAN.
COLLAPSIBLE CORE.
APPLICATION FILED DEC. 30, 1916.
1,221,349.
Patented Apr. 3, 1917.
2 SHEETS—SHEET 2.
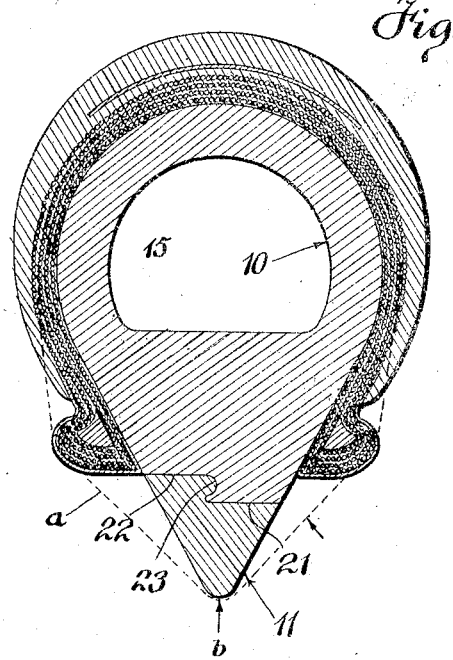
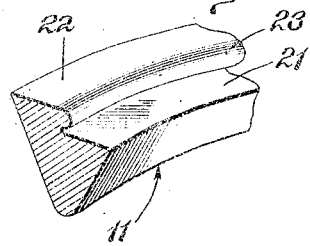
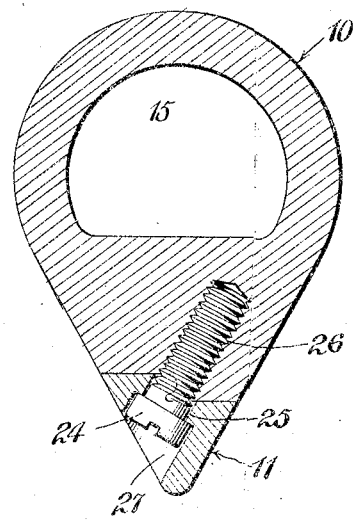
Inventor
R. M. Merriman.
By
Attorney

UNITED STATES PATENT OFFICE.

ROBERT M. MERRIMAN, OF AKRON, OHIO.

COLLAPSIBLE CORE.

1,221,349.    Specification of Letters Patent.    Patented Apr. 3, 1917.

Application filed December 30, 1916. Serial No. 139,884.

*To all whom it may concern:*

Be it known that I, ROBERT M. MERRIMAN, a citizen of the United States, residing at Akron, in the county of Summit and State of Ohio, have invented certain new and useful Improvements in Collapsible Cores, of which the following is a specification.

My invention relates to new and useful improvements in collapsible cores or forms for use in the manufacture of pneumatic tire casings and has for its primary object the construction of an improved and superior form of core for use in the manufacture of cord tires according to the method disclosed in a copending application filed by me Dec. 30, 1916 and bearing the Serial No. 139,885.

As pointed out in the above referred to application, the core is employed only during the building up and shaping of the tire or casing and is removed when the tire has been built up, being then replaced by an air bag, the tire with its air bag then being inclosed in a suitable mold and cured in the usual manner. Because of this, the core as I employ it is not subjected to high temperatures or to heavy pressures and one of the primary objects of my invention is to so form it and to construct it of such material that it may be relatively light and may, therefore, be conveniently handled by workmen during the construction of a tire.

Another object which I have in view is the provision of a collapsible core in which the sections may be readily separated from each other and removed from the built up tire, although they will be firmly held against any independent movement whatever while the core is in use.

To accomplish this, I construct a core having a body proper formed in sections and a one piece locking ring detachably secured to the body sections to hold them together and against movement. The body sections are so formed that upon removal of the ring they may readily be drawn inwardly in a radial direction and so removed from the tire built up upon the core. One object which I have in view is the provision of novel means for securing the body sections so that they will lie in a common plane during application and securing of the locking ring, and another object resides in the provision of a novel form of automatic lock between the ring and body sections which will hold the sections against radial movement while permanent fastening devices are being applied to connect the ring to the sections.

A still further object of my invention resides in constructing a core generally annular in shape and unobstructed centrally and which has a peculiar cross sectional shape which particularly adapts it for the construction of cord tires according to the method previously referred.

With these and other objects in view, my invention will be more fully described, illustrated in the accompanying drawings, and then specifically pointed out in the claims which are attached to and form a part of this application.

In the drawings:

Fig. 3 is a radial sectional view taken through one of the securing devices;

Fig. 4 is a corresponding sectional view taken at another point and showing a tire built up upon the core;

Fig. 5 is a fragmentary perspective view of the locking ring.

Corresponding and like parts are referred to in the following description and indicated in all the views of the drawings by the same reference characters.

Figure 2:
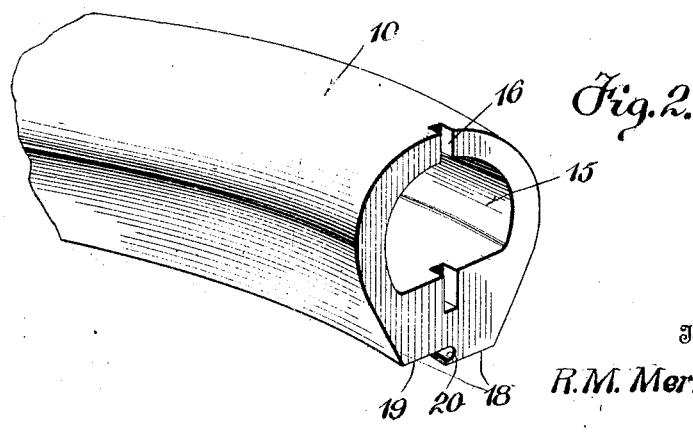
Fig. 2 is a fragmentary perspective view of one of the body sections of the core.

My improved core includes an annular body proper 10 and an annular locking member or ring 11. The body proper 10 is made up of a plurality of arcuate sections, one section 12 having radially disposed end faces, a pair of symmetrical sections 13 having radial faces at one end for engagement against the ends of the section 12 and faces at their opposite ends oblique to the radial for engagement against corresponding faces of a locking section 14. The oblique faces at the ends of the sections 13 and of the section 14 are so formed that the section 14 may be readily drawn inwardly and thus out of a tire built up upon the core to permit subsequent removal of the other section. Each section is cored circumferentially, as shown at 15, to provide, when the body of the core is assembled, an annular chamber for the sake of lightness and the end faces of all the sections are formed with radial channels 16 providing keyways for keys 17 which serve to hold the body sections in a common plane during assemblage of the core, although in no way holding the sections against inward or outward movement radially. The inner faces of the various body forming sections are so shaped that when the sections are assembled two cylindrical surfaces or faces 18 and 19 are provided, the latter being of greater diameter and the two surfaces being of substantially equal width and joined by a stop shoulder 20 which, as shown in Figs. 2 to 4 inclusive, is preferably undercut.

The locking ring 11, is substantially triangular in cross section and is shaped and proportioned to fit snugly within the main body of the core when the core as a whole is assembled. For this purpose its outer surface is formed to provide two cylindrical faces or surfaces 21 and 22 for close engagement with the faces 18 and 19, respectively, of the core body and these faces 21 and 22 are connected by a stop shoulder 23 in the form of an outwardly projecting bead adapted to seat beneath the stop shoulder 20. Because of this construction, it will be clear that when the outer or body sections of the core are assembled and held in a common plane by the keys 17, the application of the locking ring 11 to seat its bead beneath the undercut shoulders of the core will not only serve to lock the sections of the body against inward radial movement but also against outward radial movement. The complete core, as clearly shown in Figs. 3 and 4 of the drawings, is substantially ovate-acuminate in cross section, its inner side portions converging toward each other at a relatively acute angle. Anchoring screws 24 are passed through bores 25 formed in one side of the anchoring ring and threaded into tapped bores 26 formed in the body forming sections. These bores preferably have their axes disposed substantially parallel with one of the side walls of the core and the outer ends of the bores 25 are counterbored to provide seats 27 for the slotted heads of the anchoring screws or bolts 24 so that these heads will not project beyond the outer face of the core.

As the core is removed from a tire constructed upon it prior to the curing of the tire, it is not at any time subjected to high temperatures or high pressures and need not, therefore, be as strong as those usually employed in tire construction. It may, therefore, be made of wood or of thin light aluminum, iron or steel castings or of any other material found suitable for the purpose, the object being to make the core as light as possible in order that it may be readily handled by a workman during the construction of the tire.

As will be appreciated by reference to Fig. 4 of the drawings, the body proper 10 of the core is shaped and proportioned to correspond to the cross sectional shape and proportions of the tire to be constructed thereon and its inner cylindrical face 22 having the greater diameter is formed to lie in the same cylindrical surface as the base portions of the heads of a tire built up upon the core. Because of this, the locking ring 11 may be readily removed when the tire has been built to permit subsequent removal of the body sections of the core. The tires built upon this core are cord tires in which the cord is wound in a diagonal or helical direction about the core to form each ply and for this reason the core is made annular in shape with a wholly unobstructed center. Certain of the cord plies are wound about the entire core, the beads are positioned against these plies and a further cord ply is wound about the core and beads to occupy substantially the position shown in dotted lines at A in Fig. 4. This ply is then severed at each side along lines indicated by the arrows in Fig. 4 which leaves free end portions only of sufficient length to be formed about the outer faces of the beads and across the bases thereof. The outer of the remaining plies is then cut along the line indicated by the arrow at B and its ends are passed outwardly beneath the bases of the beads and upwardly along the sides thereof, as clearly shown. The locking rin 11 is, therefore, so proportioned that this s gle severing of this ply of cord will leave ends of sufficient length to be exactly formed about the beads in the manner desired. The outer ply of cord is then wound about the core, severed and formed as described in connection with the ply A and the innermost ply of all is then severed along the line B and formed about the beads as previously described in connection with another ply. It will, therefore, be clear that the peculiar cross sectional shaping and proportioning of the core is a matter of vast importance.

Figure 1:
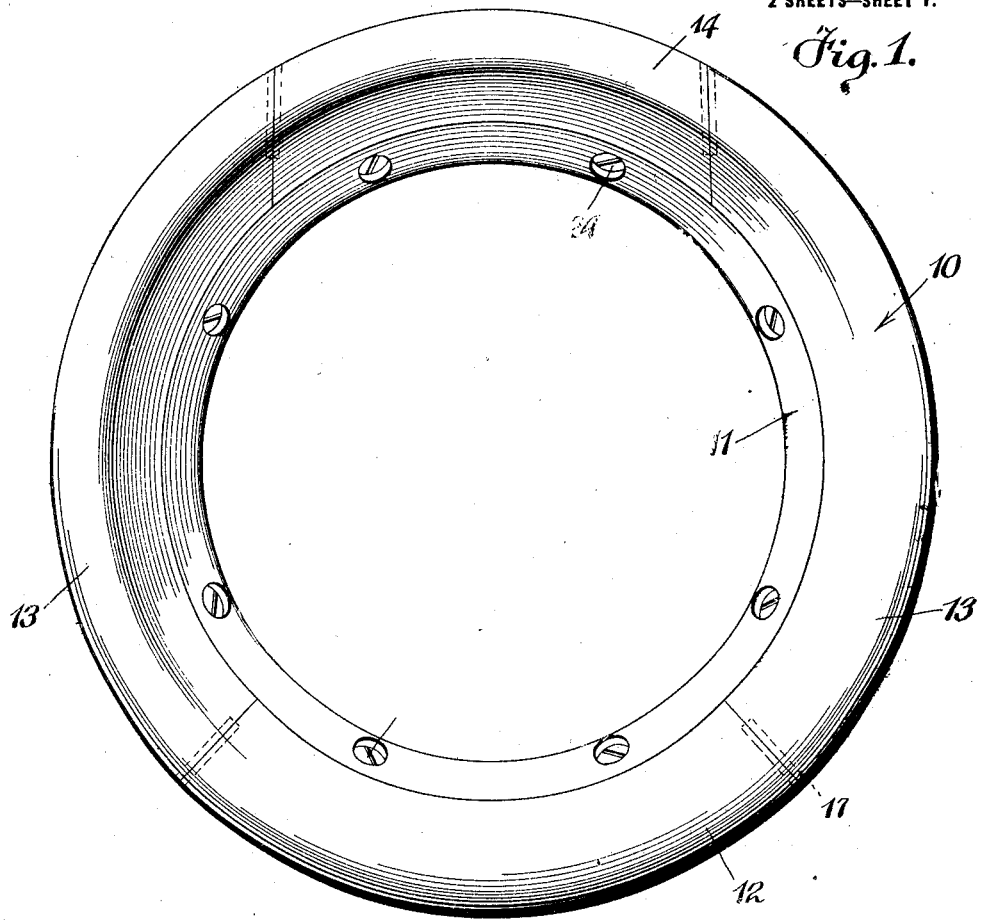
Figure 1 is an elevation of my improved core assembled.

The method of assembling and disassembling the core will be readily appreciated by reference to Figs. 1, 3 and 4 of the drawings and no description thereof is believed necessary.

Having thus described the invention, what is claimed as new is:

1. A core including an annular body proper formed in sections, the ends of which abut one against the other, the inner walls of the sections being shaped so that when the body is assembled two inner cylindrical surfaces of different diameters joined by an undercut shoulder are provided, a locking ring insertible within the body when the latter is assembled and having faces to engage the cylindrical faces of the locking ring and a bead to engage beneath the shoulder, and fastening means between the ring and each body section.

2. A core including an annular body proper formed in sections, the ends of which abut one against the other, the inner walls of the sections being shaped so that when the body is assembled two inner cylindrical surfaces of different diameters joined by an undercut shoulder are provided, a one piece locking ring insertible within the body when the latter is assembled and having faces to engage the cylindrical faces of the locking ring and a bead to engage beneath the shoulder, fastening means between the ring and each body section, and key and keyway connections between the abutting ends of the sections.

In testimony whereof I affix my signature.

ROBERT M. MERRIMAN. [L. S.]